May 15, 1945.  H. P. KUEHNI  2,376,156

PRESSURE GAUGE

Filed Feb. 7, 1944

Inventor:
Hans P. Kuehni,
by Harry E. Dunham
His Attorney.

Patented May 15, 1945

2,376,156

UNITED STATES PATENT OFFICE 2,376,156

PRESSURE GAUGE

Hans P. Kuehni, Schenectady, N. Y., assignor to General Electric Company, a corporation of New York Application February 7, 1944, Serial No. 521,317

5 Claims. (Cl. 177—351)

My invention relates to pressure gauges useful in the measurement of the pressures of fluids and gases, and its object is to provide such a gauge suitable for the measurement of differential or direct pressures over a wide range with good accuracy, including pressure changes which occur at high rapidity, such, for example, as the pressure changes which occur in the cylinder of a compressor. In carrying my invention into effect, I make use of the principle of magnetostriction and cause the pressure changes to be measured to vary the compression of a magnetostriction element constituting the core of a variable inductance, which is contained in a suitable electrical measurement circuit responsive to the changes in the permeability of the magnetostriction element.

The features of my invention which are believed to be novel and patentable will be pointed out in the claims appended hereto.

Figure 1:
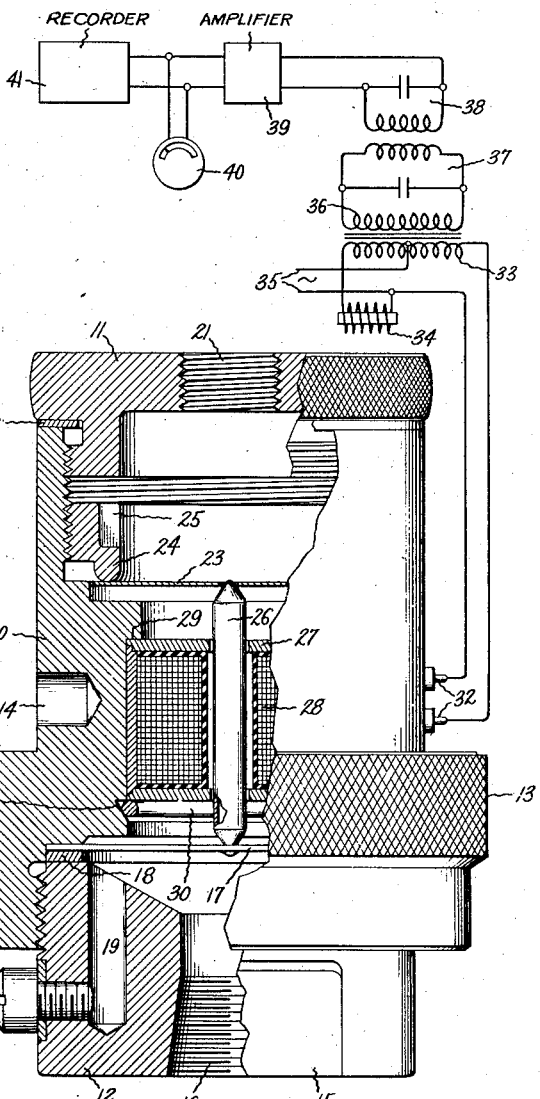
Figure 2:
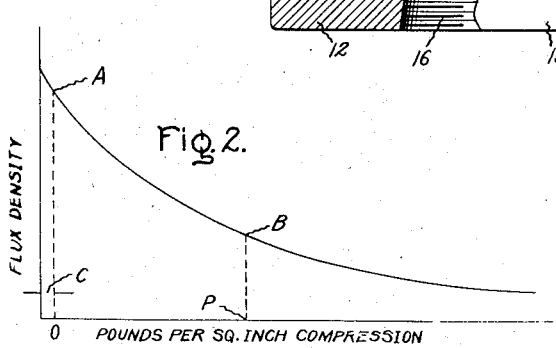

For a better understanding of my invention, reference is made in the following description to the accompanying drawing which represents in Fig. 1 a preferred embodiment of my improved pressure gauge, partially in section, and electrical measuring circuit connections thereto; and Fig. 2 is a flux density compression stress curve of the magnetostriction element.

The pressure gauge unit shown comprises a hollow metallic casing structure 10 of circular cross section with one end closed by an orifice cap 11 and the other end closed by an orifice plug 12. The cap and plug are threaded into the casing part 10 and are hence removable. Cap 11 has a knurled surface. There is an enlarged knurled surface portion 13 on the casing part 10. Fourteen (14) indicates a hole in such part for inserting a pin type wrench, and the plug 12 has flattened sides as indicated at 15, so that a wrench may be applied thereto firmly to seat the plug in the threaded opening into which it screws. The plug 12 has a central threaded orifice at 16 into which a pipe communicating with the gas or liquid pressure to be measured may be screwed. The opening 16 communicates to the lower side of a circular resilient pressure sealed diaphragm 17 which diaphragm is supported about its edge by being clamped between an inner shoulder of the casing 10 and the inner flared end of the hollow plug 12 with a gasket 18 intervening. When liquid pressure is to be investigated and it is desirable to bring the liquid directly against the diaphragm 17, entrapped air or other gas may be vented from adjacent the diaphragm by way of a vent 19 in one side of plug 12 by loosening a screw plug 20 near the lower end of the vent until all of the gas has escaped.

The cap 11 likewise has a central threaded opening or orifice at 21 into which a pipe may be screwed to connect a second pressure system to the gauge unit in case a differential pressure is to be investigated. Otherwise the opening 21 may be left open or loosely closed by a screw plug to keep dirt out of the gauge. Twenty-two (22) indicates a gasket between the cap 11 and the upper end of the casing 10 by means of which a gas-tight seal may be obtained. When the cap 11 is removed, access to an auxiliary circular resilient diaphragm or spring 23 and an adjustable seat 24 therefor may be had. The seat 24 is in the form of a hollow externally threaded nut which fits the threaded opening into which the cap 11 is screwed. Twenty-five (25) indicates a wrench or screwdriver hole in the inner surface of the nut to facilitate its turning and vertical adjustment of the seat for the upper edge of diaphragm 23. The diaphragm 23 is not a pressure sealed diaphragm and is not subject to the pressure under investigation, but has one or more openings or a sufficiently uneven fit against its seat that the static pressure above and below this diaphragm is always the same. The auxiliary diaphragm 23 serves merely as a spring and may for convenience be called a spring diaphragm to distinguish it from the pressure diaphragm 17.

Extending between the pressure diaphragm 17 and the auxiliary diaphragm 23 at their centers is a thin tubular magnetostriction bar or post 26 made of magnetic material, the permeability of which changes with compression. This bar 26 presses the diaphragm 23 upward against its seat at the lower edge of nut 24. Surrounding the bar 26 is a magnetic shell and coil holder 27 in which a coil 28 is contained. The coil and shell are held in place between an inner shoulder 29 of the casing 10 and a resilient snap ring 30 which expands and partially enters into a groove at 31 at the lower end of the shell 27. The shell 27, magnetostriction bar 26, and ring 31 may be inserted in place through the lower end of casing 10 when the plug 12 and diaphragm 17 are removed. The bar 26 extends through the center of the coil and shell without touching so that upward pressure on diaphragm 17 is communicated through the bar to the auxiliary diaphragm 23 and causes compression forces in the bar. Also, the gaseous or liquid pressure prevailing in the cap end of the gauge is communicated directly to the upper surface of diaphragm 17. The spool is centered in the central cavity of the casing 10, and the magnetostriction tube 26 is centered by having its pointed ends set into depressions at the centers of the diaphragms. The depression in the upper diaphragm 23 may be a cone-shaped hole. The tube 26 is made of a material such as nickel steel having high magnetostriction or change in permeability with changes in stress therein, and it forms the core of the coil, and the shell 27 completes the magnetic circuit about the coil. Shell 27 is made of a magnetic material having high permeability, such as the nickel iron alloy known by the trade name Nicaloi. The air gaps between the tube 26 and shell 27 are made small. An air gap in this magnetic circuit reduces sensitivity but improves the wave shape of the alternating current with which the coil is energized. The tube 26 may have an outside diameter of one-eighth inch and its wall thickness may be of the order of 0.006 inch.

In using the gauge, the tube 16 is under some slight initial compression for zero pressure adjustment calibration and for this purpose, the seat 24 for the upper diaphragm 23 is made vertically adjustable by screwing the seat nut 24 up and down and, when once adjusted, remains fixed in place.

In Fig. 2, I have shown a characteristic curve of the ratio of flux density in the tube 26 and compression on tube 26 in pounds per square inch, where the alternating current excitation on the coil is held constant. It is noted that the flux density decreases with increase in compression due to the decrease in permeability of the tube 26. The gauge may be calibrated to have a zero pressure measurement adjustment corresponding to point A on the curve. That is, with zero pressure difference on opposite sides of diaphragm 17, nut 24 is screwed down until the flux density in tube 26 corresponds to point A, and the initial compression on the tube corresponds to the value C. Now, when gaseous or liquid pressure is applied to the chamber beneath the diaphragm 17, the compression of the tube 26 increases and the flux density in the tube decreases. The measurement range may extend to point B on the curve, as this is the most sensitive part of the curve. Flux density B corresponds to pounds per square inch compression of the tube 26 of value P. Thus the pressure measurement range is from O to P, as indicated in Fig. 2.

The relation between compression in pounds per square inch of tube 26 and the differential liquid or gaseous pressure on diaphragm 17 depends upon the relation between the cross-sectional area of the tube and the effective area of the diaphragm, and also, on the relative stiffness of the two diaphragms 17 and 23. When pressure is applied upward on diaphragm 17, its center springs upwardly and moves the rod 26 and the center of diaphragm 23 upwardly by a like amount, and the upward force is distributed between and resisted by the spring force of the two diaphragms. For instance, I may select a diaphragm 17 of such thickness as compared to that of diaphragm 23 that the upward force is equally distributed between the two diaphragms, in which case tube 26 would be subject to one-half the upward pressure applied to the lower diaphragm. I may now replace diaphragm 17 with a thicker diaphragm such that only one-tenth of the pressure applied is conveyed through the tube to the upper diaphragm, thus changing the calibration range by five. I may now replace the lower diaphragm by a still thicker and stiffer diaphragm such that only one-fiftieth of the pressure applied to the lower diaphragm is conveyed to the upper diaphragm, thus again changing the calibration range by five, or twenty-five as compared to the thinnest diaphragm 17 first assumed. Thus an important aspect of my invention is the provision of several different thicknesses, interchangeable, pressure diaphragms for use at 17 for the purpose of changing the pressure measurement range of the device over wide limits. This change is made by simply unscrewing plug 12 and replacing one diaphragm with another. The diaphragms may be made of stainless steel or phosphor bronze, or any other suitable resilient material that will not corrode in the presence of the gases or liquids with which they come in contact.

It is also possible to change the range of calibration of the gauge by changes in the stiffness of the upper diaphragm or by changes in both diaphragms, but in general sufficient changes in this respect are obtained by changing the pressure diaphragm at 17, which leaves everything else unchanged. When the calibration of the gauge is changed as described above, the magnetostriction range of operation as explained in connection with Fig. 2 is not disturbed. That is, the compression applied to the magnetostriction tube 26 always operates within the most satisfactory flux density and compression range A—B, Fig. 2, although a change in the diaphragm at 17 may require some small adjustment of the position of the upper diaphragm seat 24 to recalibrate for the initial adjustment A.

Another point that should receive consideration, where the gauge is likely to be subjected to vibration, has to do with the inertia and spring relation of the two diaphragms so as to avoid subjecting the magnetostriction element to compression forces which are due to any tendency of the two diaphragms and element 26 to accelerate unequally when subjected to vibration of any character. When the pressures to be recorded are high and the diaphragm members are very stiff, the acceleration forces can affect the pressure gauge readings only slightly in any event. However, where the pressure pulsations to be recorded are small, the acceleration effects are comparatively large because it is not possible mechanically to reduce the mass of the elements correspondingly. It is therefore desirable to reduce the mass of the parts which move with the diaphragms as much as possible, and it will be noted that in my gauge the only mass involved is that of the diaphragms themselves and the lightweight, thin-walled tube 26 between them. When the gauge unit is subject to vibration in the direction of its longitudinal axis and assuming for the moment that the element 26 is not present, the centers of the diaphragms tend to remain stationary because of their mass and both will deflect in the same direction by an unequal amount in general. However, it is readily seen that by properly matching the stiffness of the diaphragms and by properly distributing the masses, equal deflections of both diaphragms in response to acceleration may be obtained. When this is the case, the distance between the centers of the diaphragms does not tend to vary under the accelerations applied and, therefore, the pressure response element 26 placed between them will not receive any part of the acceleration forces except those minor acceleration forces which are set up by itself. In general, this condition is satisfied when $$\frac{M17}{S17^3} = \frac{M23}{S23^3}$$

where M17 and M23 are the masses associated with the diaphragms 17 and 23, and S17 and S23 are the corresponding diaphragm thicknesses. Where, as here, there are no connecting push rods or the like used to convey the pressure to be measured to the pressure diaphragm, the above relations are easily obtained.

The effective inductance of the solenoid having the core 26 and the coil 28 varies in response to the change in permeability of its magnetic circuit due to the compression changes on tube 26, and the coil is connected to a suitable measuring circuit so that such changes can be measured in terms of pressure changes. I prefer to employ an A.-C. bridge circuit as represented, where the coil 28 in series with one-half of a transformer winding 33, and a similar gauge unit or standard 34 in series with the other half of the transformer winding 33, are energized in parallel from an A.-C. source 35. The unit 34 may be a duplicate of the gauge described or simply the magnetostriction reactance coil element thereof adjusted for the condition A, Fig. 2. When there is zero fluid or gas pressure on the measurement gauge, the bridge will be balanced and there will be no voltage induced in its secondary 36. When pressure is now applied to the pressure diaphragm 17, the current in coil 28 will increase due to the decrease in reactance, and a proportional current will be induced in the winding 36 of the measurement transformer. I prefer to include a pair of bandpass filters 37 and 38 in the measuring circuit to prevent unwanted harmonic currents from influencing the measurements. Thirty-nine (39) represents an amplifier and 40 and 41 are indicating and recording instruments, respectively. Where rapid pressure pulsations are to be investigated, I prefer to use a source of alternating current supply of from 2000 to 4000 cycles. Satisfactory measurement operation is obtained where the frequency of the source of supply is at least four times greater than the frequency of the pressure pulsations to be recorded. For investigating rapidly varying pressures, the recording instrument at 41 may be of the oscillograph type.

The pressure gauge unit described may be used in any position, either end up or with its axis horizontal. Either static or rapidly varying pressures may be measured and recorded. The gauge may be used to measure pressures with respect to atmospheric pressure or with respect to any reference pressure by piping the reference pressure to orifice 21. In so doing, the higher pressure should be piped to orifice 16. The gauge is readily adjustable for several different ranges by changing the pressure diaphragm at 17, and the gauge is so designed as to prevent mass acceleration errors which might otherwise be occasioned by vibration.

What I claim as new and desire to secure by Letters Patent of the United States is:

1. A pressure gauge unit comprising a casing, a flexible pressure sealed circular diaphragm supported at its edges in said casing, means for subjecting one side of said diaphragm to pressure variations to be investigated, a circular spring diaphragm supported at its edges within said casing parallel to the pressure diaphragm, a magnetostriction element compressed between the centers of said diaphragms, means for adjusting the position of said spring diaphragm relative to the pressure diaphragm so as to adjust the initial compression on said magnetostriction element, an alternating current coil surrounding said magnetostriction element for producing a flux therein, and a magnetic circuit surrounding said coil and spaced from said element at either end of said coil by small air gaps.

2. A pressure gauge unit comprising a casing, a variable inductance within said casing comprising a hollow cylindrical coil, a magnetic shell enclosing the outer side and end portions of said coil except for openings axially of the coil, a magnetostriction element freely extending through said coil and shell openings but spaced from the end portions of said shell by narrow air gaps, a circular spring diaphragm, an adjustable seat supporting the edges thereof, a circular resilient pressure diaphragm supported at its edges, said magnetostriction element being held by compression between the centers of said diaphragms, a hollow plug threaded into an opening in one end of said casing for clamping the pressure diaphragm in place at its edges with a gas-tight seal, said plug being removable and when removed permits the pressure diaphragm to be withdrawn through such opening for replacement by another diaphragm, said plug having pipe fitting facilities whereby the pressure to be investigated may be piped thereto and the pressure diaphragm exposed to such pressure, said pressure diaphragm serving to resist some of the force of such pressure and serving to convey a portion of such force through the magnetostriction element to the spring diaphragm to vary said inductance.

3. A pressure gauge unit comprising a hollow casing of circular cross section, a circular seat within said casing, a circular resilient pressure diaphragm and a plug fitting into one end of said casing for clamping said pressure diaphragm at its edges against said seat with a gas-tight seal, means for exposing the opposite sides of said diaphragm to pressure differences to be investigated, said plug and diaphragm being removable from said casing to permit the use of different stiffness pressure diaphragms therein, a circular spring diaphragm disposed within said casing parallel and coaxial with the pressure diaphragm, means for supporting the edges of said spring diaphragm which supporting means is adjustable within said casing for varying the spacing between the edges of said diaphragms, a magnetostriction element held by compression between the centers of said diaphragms so as to be subject to a compression force which varies with the pressure differences under investigation, and a solenoid having said magnetostriction element as its magnetic core such that the inductance of said solenoid is varied in response to compression changes in said element.

4. In a pressure gauge, pressure measuring magnetostriction apparatus comprising a pair of circular resilient diaphragms disposed parallel and coaxial to each other, said diaphragms being supported at their edges and having their centers connected together by a magnetostriction sensitive magnetic element which is held in place between the centers of said diaphragms solely by compression forces between the diaphragms, means for subjecting one of said diaphragms to pressure differences to be investigated causing such diaphragm to bend and conveying a portion of the bending force applied thereto to the other diaphragm through said element thereby varying the compression of such element, said diaphragms having the relation $$\frac{M}{S^3}=\frac{M_1}{S_1^3}$$

where $M$ and $M_1$ represent the masses of the diaphragms and $S$ and $S_1$ their thicknesses respectively.

5. A pressure gauge unit comprising a hollow metallic casing of circular cross section, screw threaded plug closures for opposite ends of said casing by means of which said casing may be hermetically sealed, pipe fitting openings in said plug closures for piping pressures to be measured thereto, a pair of circular resilient diaphragms supported at their edges parallel and coaxial to each other within said casing, said diaphragms being accessible and removable from said casing when the end plug closures are removed, a thin tubular magnetostriction element which is supported between the centers of said diaphragms solely by compression forces, one of said diaphragms being subject to the difference in pressure existing in the two ends of said casing and the other diaphragm being subject only to the bending force applied thereto through the magnetostriction element, means for adjusting the initial spacing between said diaphragms and an inductance coil between the diaphragms having a substantially closed magnetic circuit including said magnetostriction element.

HANS P. KUEHNI.